(12) United States Patent
Scott

(10) Patent No.: US 6,824,152 B1
(45) Date of Patent: Nov. 30, 2004

(54) DOLLY DEVICE

(76) Inventor: John M. Scott, 1176 78th Ave., Oakland, CA (US) 94621

(*) Notice: Subject to any disclaimer, the term of this patent is extended or adjusted under 35 U.S.C. 154(b) by 119 days.

(21) Appl. No.: 10/232,039

(22) Filed: Aug. 30, 2002

(51) Int. Cl.[7] ................................................ B62B 3/02
(52) U.S. Cl. ................... 280/79.7; 280/651; 280/43.16; 5/510
(58) Field of Search ............................ 280/79.7, 79.11, 280/651, 639, 42, 35, 43.15, 43.16; 5/510

(56) References Cited

U.S. PATENT DOCUMENTS

| | | | |
|---|---|---|---|
| 2,816,771 A | 12/1957 | Hunt | |
| 3,136,429 A | * 6/1964 | Kleinschmidt | 414/809 |
| 3,278,042 A | * 10/1966 | Frydenberg | 410/32 |
| 3,782,748 A | * 1/1974 | Poland | 280/35 |
| 3,884,491 A | * 5/1975 | Hughart | 280/35 |
| 3,955,826 A | 5/1976 | Riedesel | |
| 4,166,638 A | * 9/1979 | De Prado | 280/638 |
| 4,887,836 A | * 12/1989 | Simjian | 280/651 |
| 5,018,930 A | * 5/1991 | Hardin et al. | 414/458 |
| 5,048,850 A | 9/1991 | McDonald | |
| 5,120,072 A | 6/1992 | Laramie | |
| D333,200 S | 2/1993 | Berrian | |
| 5,332,243 A | * 7/1994 | Berry | 280/35 |
| 5,863,056 A | 1/1999 | Hostetter | |
| 6,036,219 A | * 3/2000 | Oefelein et al. | 280/638 |
| 6,203,031 B1 | * 3/2001 | Leverington | 280/35 |
| 6,371,497 B1 | * 4/2002 | Scire | 280/42 |
| 6,612,601 B1 | * 9/2003 | Granlind | 280/414.1 |

* cited by examiner

Primary Examiner—Brian L. Johnson
Assistant Examiner—Jeffrey Restifo

(57) ABSTRACT

A dolly device for facilitating moving of an object by a user. The dolly device includes a base member being designed for supporting the object when the object is placed on the base member. A pair of side members are oppositely coupled to the base member. Each of the side members is positioned substantially orthogonally to the base member. The side members are designed for engaging the object for inhibiting the object from tipping off of the base member when the object is positioned on the base member. At least one wheel is rotatably coupled to each of the side members. The wheel is designed for rollably engaging a support surface for facilitating movement of the object across the support surface when the object is positioned on the base member and the base member is moved across the support surface by the user.

6 Claims, 4 Drawing Sheets

DOLLY DEVICE

BACKGROUND OF THE INVENTION

1. Field of the Invention

The present invention relates to moving dollies and more particularly pertains to a new dolly device for facilitating moving of an object by a user.

2. Description of the Prior Art

The use of moving dollies is known in the prior art. U.S. Pat. No. 2,816,771 describes a device for moving substantially planar objects such as tables. Another type of moving dolly is U.S. Pat. No. 3,995,826 having a frame for receiving a mattress and casters to facilitate moving of the mattress. U.S. Pat. No. 5,863,056 has a system of straps and plurality of rollers for receiving a mattress and facilitating moving of the mattress across a support surface. U.S. Pat. No. 5,120,073 has a hand truck for receiving longitudinal objects and facilitating moving of the longitudinal objects. U.S. Pat. No. 5,048,850 has a pair of spaced plates connected by adjusting bolts and an axle which support an object positioned between the plates and facilitate moving of the object. U.S. Pat. No. Des. 333,200 shows a furniture moving dolly.

SUMMARY OF THE INVENTION

An object of the present invention is to provide a new dolly device that facilitates moving of an object by a single user.

Even still another object of the present invention is to provide a new dolly device that is adjustable to handle objects of varying widths.

To this end, the present invention generally comprises a base member being designed for supporting the object when the object is placed on the base member. A pair of side members are oppositely coupled to the base member. Each of the side members is positioned substantially orthogonally to the base member. The side members are designed for engaging the object for inhibiting the object from tipping off of the base member when the object is positioned on the base member. At least one wheel is rotatably coupled to each of the side members. The wheel is designed for rollably engaging a support surface for facilitating movement of the object across the support surface when the object is positioned on the base member and the base member is moved across the support surface by the user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
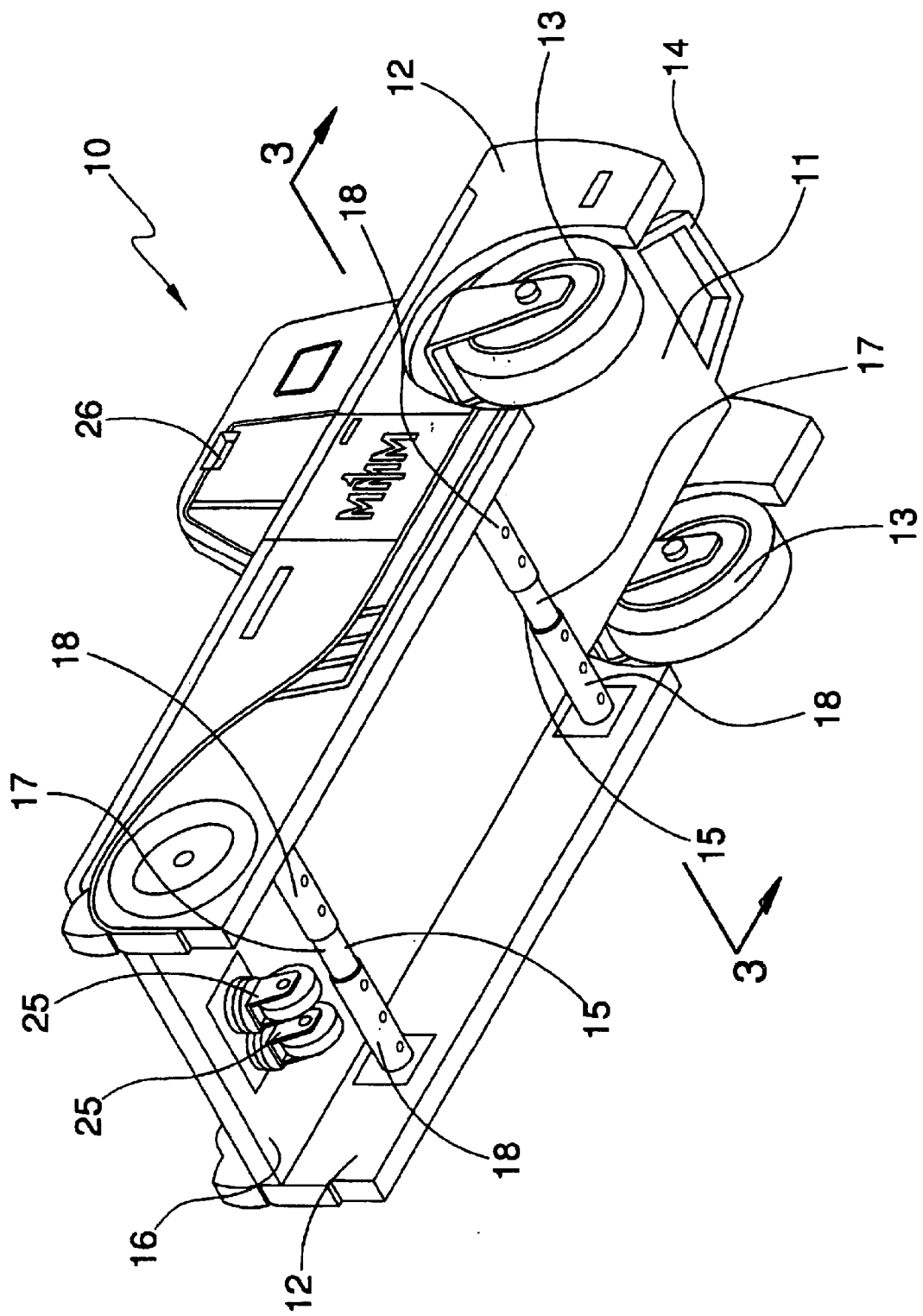
FIG. 1 is a bottom perspective view of a new dolly device according to the present invention.
Figure 2:
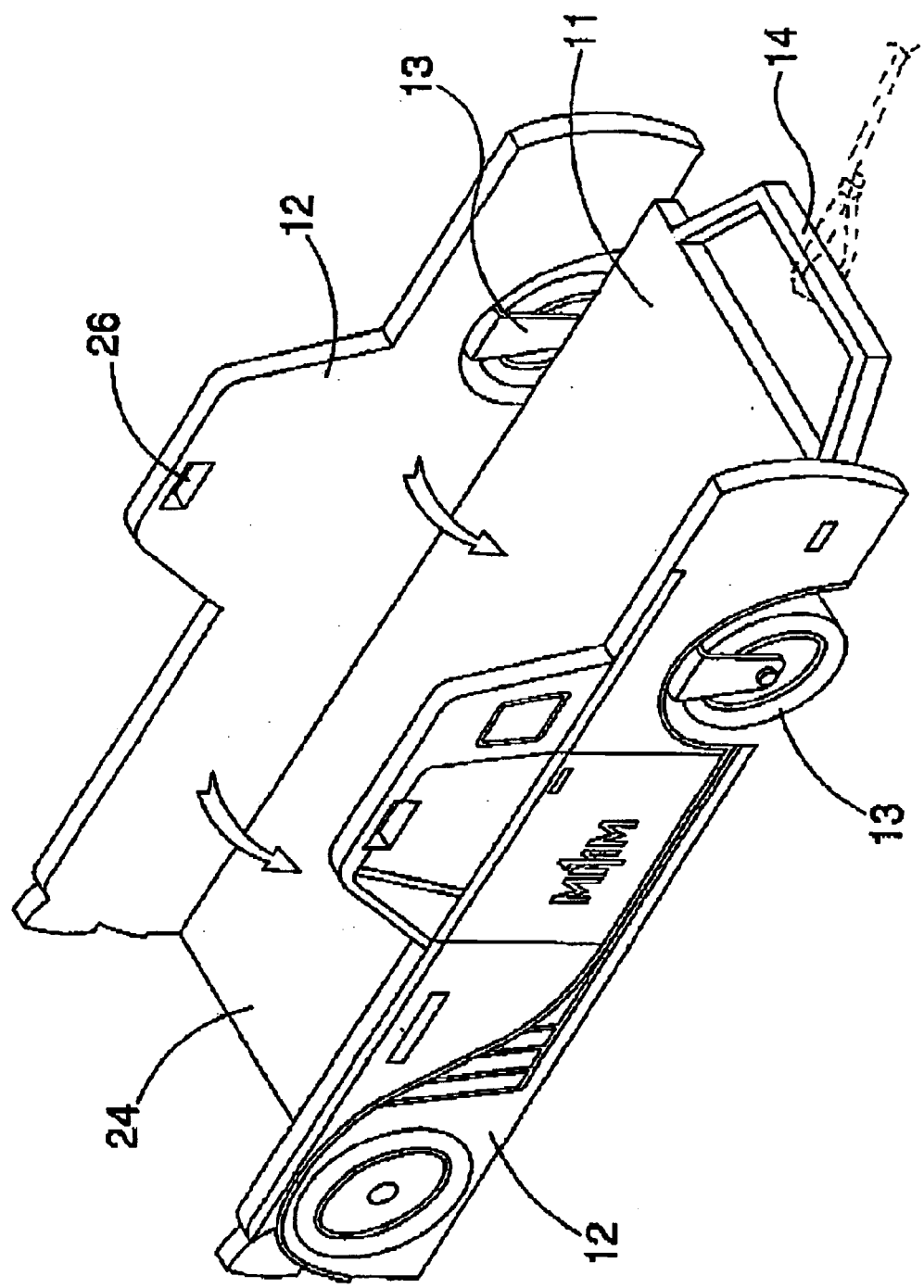
FIG. 2 is a top perspective view of the present invention.
Figure 3:
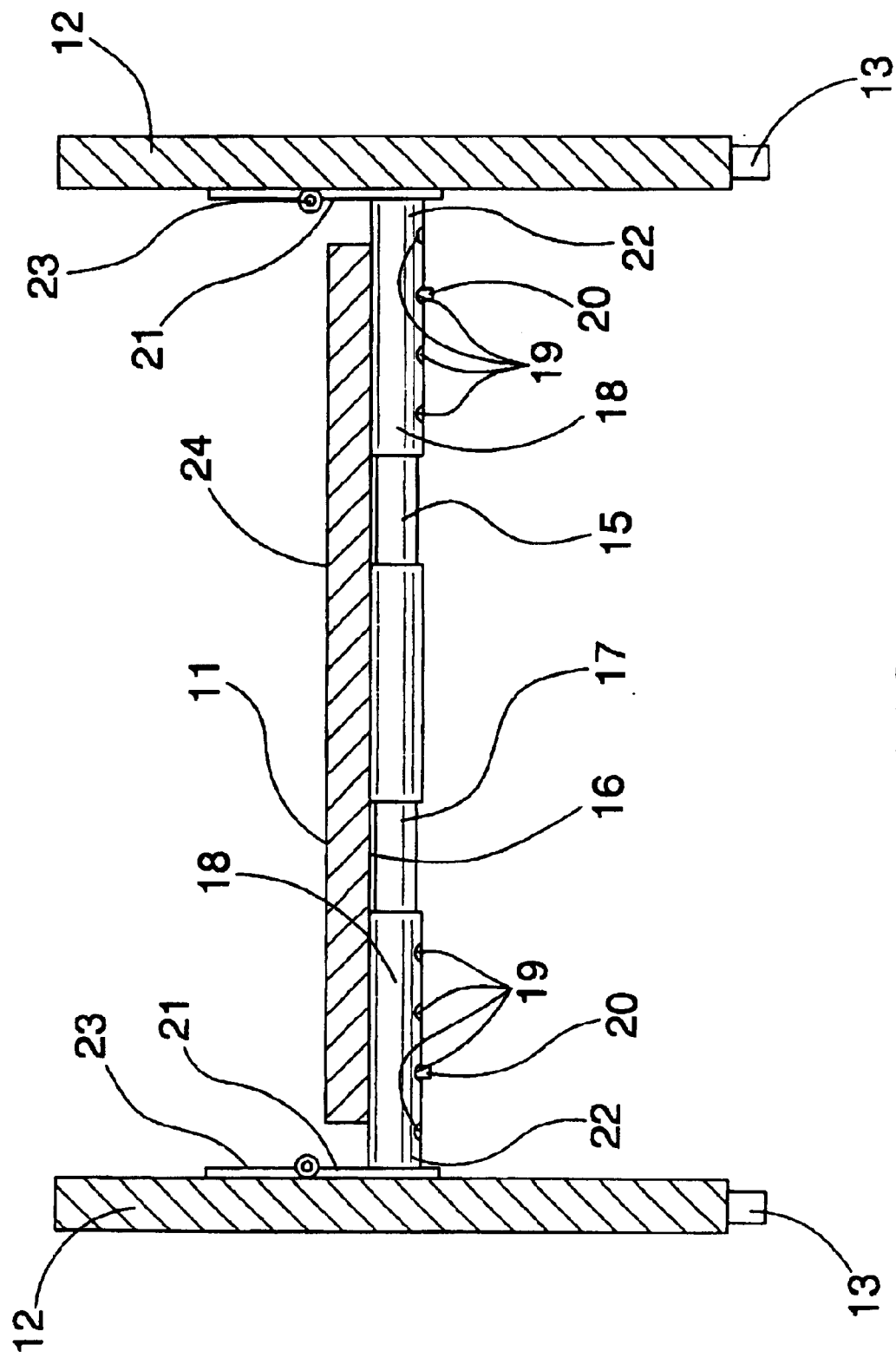
FIG. 3 is a cross-sectional view of the present invention taken along line 3—3 of FIG. 1.
Figure 4:
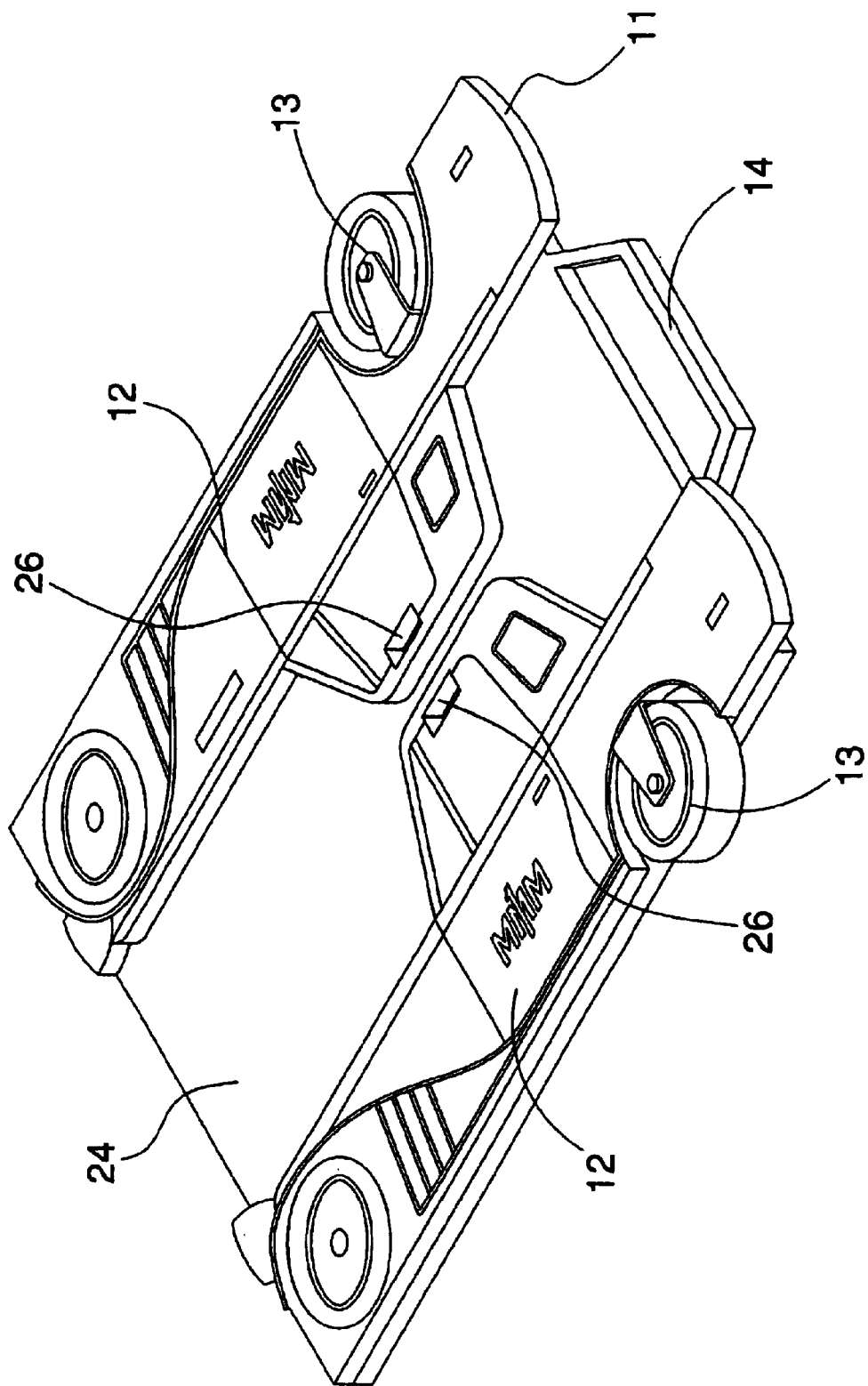
FIG. 4 is a top perspective view of the present invention with the side walls pivoted over the upper surface of the base member.

With reference now to the drawings, and in particular to FIGS. 1 through 4 thereof, a new dolly device embodying the principles and concepts of the present invention and generally designated by the reference numeral 10 will be described.

As best illustrated in FIGS. 1 through 4, the dolly device 10 generally comprises a base member 11 being designed for supporting the object when the object is placed on the base member 11. The base member 11 has width of about 9 inches and a length of about 18 inches.

A pair of side members 12 are oppositely coupled to the base member 11. Each of the side members 12 is positioned substantially orthogonally to the base member 11. The side members 12 are designed for engaging the object for inhibiting the object from tipping off of the base member 11 when the object is positioned on the base member 11. Each of the side members 12 has a height of about 4-½ inches.

At least one wheel 13 is rotatably coupled to each of the side members 12. The wheel 13 is designed for rollably engaging a support surface for facilitating movement of the object across the support surface when the object is positioned on the base member 11 and the base member 11 is moved across the support surface by the user.

A handle member 14 is coupled to the base member 11. The handle member 14 extends outwardly from the base member 11. The handle member 14 is designed for being engaged by the hands of the user to allow the user to move the base member 11 across the support surface.

A plurality of expansion members 15 are coupled to a lower surface 16 of the base member 11. Each of the expansion members 15 is coupled between the side members 12. Each of the expansion members 15 is adjustable for varying a length of the associated one of the expansion member for adjusting a distance between the side member whereby the side members 12 are designed for engaging objects of varying widths when the object is placed on the base member 11.

Each of the expansion members 15 comprises a main portion 17 and a pair of sleeve portions 18. The main portion 17 is coupled to the lower surface 16 of the base member 11. Each of the sleeve portions 18 slidably engages the main portion 17. Each of the sleeve portions 18 is coupled to one of the side members 12 whereby the sleeve portions 18 slide on the main portion 17 for adjusting the distance between the side members 12.

Each of the sleeve portions 18 comprises a plurality of apertures 19 extending through the sleeve portions 18. The main portion 17 comprises a plurality of pin members 20 being outwardly biased from the main portion 17. Each of the pin members 20 selectively engages one of the apertures 19 of an associated one of the sleeve portions 18 for securing the associated one of the sleeve portions 18 at a desired position for selectively positioning the associated one of the side members 12 with respect to the base member 11.

Each of the expansion members 15 comprises a pair of plate members 21. One of the plate members 21 is coupled to a free end 22 of one of the sleeve portions 18. The associated one of the side members 12 is hingably coupled to an upper edge 23 of the associated one of the plate members 21 whereby each of the side members 12 is selectively pivotally to be positioned over an upper surface 24 of the base member 11 for facilitating storage.

A plurality of caster members 25 are pivotally coupled to the base member 11. Each of the caster members 25 is designed for rollably engaging the support surface whereby the caster members 25 are for improving stability and steering of the base member 11 when the object is positioned on the base member 11 and is moved by the user.

Each of the side members 12 comprises a bore 26. The bore 26 extends through the associated one of the side members 12 whereby the bore 26 is designed for receiving a rope for facilitating moving of the object positioned on the base member 11.

In use, the user depresses the pins of each of the expansion members 15 to allow sliding of the sleeve portions 18 on the main portion 17s until the user adjusted the side members 12 to receive the width of the object to be moved. The user then places the wheel 13 of each side member and the caster members 25 on the support surface and places the object on the base member 11. The user can then use the handle member 14 to move the object or place a rope through the bore 26 of each of the side members 12 to allow the user to use the rope to move the object. When the user has finished moving the side members 12 can then be pivoted over the upper surface 24 of the base member 11 to use less space during storage.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A dolly device for facilitating moving of an object by a user, the dolly device comprising:

a base member being adapted for supporting the object when the object is placed on said base member;

a pair of side members being oppositely coupled to said base member, each of said side members being positioned substantially orthogonally to said base member, said side members being adapted for engaging the object for inhibiting the object from tipping off of said base member when the object is positioned on said base member;

at least one wheel being rotatably coupled to each of said side members, said wheel being adapted for rollably engaging a support surface for facilitating movement of the object across the support surface when the object is positioned on said base member and said base member is moved across the support surface by the user;

a plurality of expansion members being coupled to a lower surface of said base member, each of said expansion members being coupled between said side members, each of said expansion members being adjustable for varying a length of the associated one of said expansion member for adjusting a distance between said side member such that said side members are adapted for engaging objects of varying widths when the object is placed on said base member;

each of said expansion members comprising a main portion and a pair of sleeve portions, said main portion being coupled to said lower surface of said base member, each of said sleeve portions slidably engaging said main portion, each of said sleeve portions being coupled to one of said side members such that said sleeve portions slide on said main portion for adjusting the distance between said side members; and each of said expansion members comprising a pair of plate members, one of said plate members being coupled to a free end of one of said sleeve portions, the associated one of said side members being hingably coupled to an upper edge of the associated one of said plate members such that each of said side members is selectively pivotally to be positioned over an upper surface of said base member for facilitating storage.

2. The dolly device as set forth in claim 1, further comprising:

a handle member being coupled to said base member, said handle member extending outwardly from said base member, said handle member being adapted for being engaged by the hands of the user to allow the user to move said base member across the support surface.

3. The dolly device as set forth in claim 1, further comprising:

each of said sleeve portions comprising a plurality of apertures extending through said sleeve portions, said main portion comprising a plurality of pin members being outwardly biased from said main portion, each of said pin members selectively engaging one of said apertures of an associated one of said sleeve portions for securing the associated one of said sleeve portions at a desired position for selectively positioning the associated one of said side members with respect to said base member.

4. The dolly device as set forth in claim 1, further comprising;

at least one caster member being pivotally coupled to said base member, said caster member being adapted for rollably engaging the support surface such that said caster member is for improving stability and steering of said base member when the object is positioned on said base member and being moved by the user.

5. The dolly device as set forth in claim 1, further comprising:

each of said side members comprising a bore, said bore extending through the associated one of said side members such that said bore is adapted for receiving a rope for facilitating moving of the object positioned on said base member.

6. A dolly device for facilitating moving of an object by a user, the dolly device comprising:

a base member being adapted for supporting the object when the object is placed on said base member;

a pair of side members being oppositely coupled to said base member, each of said side members being positioned substantially orthogonally to said base member, said side members being adapted for engaging the object for inhibiting the object from tipping off of said base member when the object is positioned on said base member;

at least one wheel being rotatably coupled to each of said side members, said wheel being adapted for rollably engaging a support surface for facilitating movement of the object across the support surface when the object is positioned on said base member and said base member is moved across the support surface by the user;

a handle member being coupled to said base member, said handle member extending outwardly from said base member, said handle member being adapted for being engaged by the hands of the user to allow the user to move said base member across the support surface;

a plurality of expansion members being coupled to a lower surface of said base member, each of said expansion members being coupled between said side members, each of said expansion members being adjustable for varying a length of the associated one of said expansion member for adjusting a distance between said side member such that said side members are adapted for engaging objects of varying widths when the object is placed on said base member;

each of said expansion members comprising a main portion and a pair of sleeve portions, said main portion being coupled to said lower surface of said base member, each of said sleeve portions slidably engaging said main portion, each of said sleeve portions being coupled to one of said side members such that said sleeve portions slide on said main portion for adjusting the distance between said side members;

each of said sleeve portions comprising a plurality of apertures extending through said sleeve portions, said main portion comprising a plurality of pin members being outwardly biased from said main portion, each of said pin members selectively engaging one of said apertures of an associated one of said sleeve portions for securing the associated one of said sleeve portions at a desired position for selectively positioning the associated one of said side members with respect to said base member;

each of said expansion members comprising a pair of plate members, one of said plate members being coupled to a free end of one of said sleeve portions, the associated one of said side members being hingably coupled to an upper edge of the associated one of said plate members such that each of said side members is selectively pivotally to be positioned over an upper surface of said base member for facilitating storage;

a plurality of caster members being pivotally coupled to said base member, each of said caster members being adapted for rollably engaging the support surface such that said caster members are for improving stability and steering of said base member when the object is positioned on said base member and being moved by the user;

each of said side members comprising a bore, said bore extending through the associated one of said side members such that said bore is adapted for receiving a rope for facilitating moving of the object positioned on said base member.

* * * * *